US012154585B2

(12) United States Patent
Bou Daher et al.

(10) Patent No.: US 12,154,585 B2
(45) Date of Patent: Nov. 26, 2024

(54) VOICE ACTIVITY DETECTION

(71) Applicant: Bose Corporation, Framingham, MA (US)

(72) Inventors: Elie Bou Daher, Marlborough, MA (US); Vigneish Kathavarayan, Marlborough, MA (US); Cristian Marius Hera, Lancaster, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/680,559

(22) Filed: Feb. 25, 2022

(65) Prior Publication Data

US 2023/0274753 A1 Aug. 31, 2023

(51) Int. Cl.

*G10L 25/84* (2013.01)
*G10L 21/0224* (2013.01)
*G10L 25/78* (2013.01)
*G10L 21/0208* (2013.01)
*G10L 21/0216* (2013.01)

(52) U.S. Cl.

CPC .......... *G10L 21/0224* (2013.01); *G10L 25/78* (2013.01); *G10L 25/84* (2013.01); *G10L 21/0208* (2013.01); *G10L 2021/02166* (2013.01)

(58) Field of Classification Search

CPC ........... G10L 25/84; G10L 2021/02166; G10L 21/0364; G10L 21/0208; G10L 2021/02082; G10L 25/51; G10L 25/78; G10L 21/0224

See application file for complete search history.

(56) References Cited

U.S. PATENT DOCUMENTS 9,014,387 B2 * 4/2015 Hendrix ............... G10K 11/175 381/74
9,226,068 B2 * 12/2015 Hendrix ............... H04R 1/1083
9,230,532 B1 * 1/2016 Lu .................... G10K 11/17855
9,369,557 B2 * 6/2016 Kaller ..................... H04M 1/58
10,424,315 B1 * 9/2019 Ganeshkumar ...... H04R 1/1008
10,438,605 B1 * 10/2019 Ganeshkumar ....... H04M 9/082
10,499,139 B2 * 12/2019 Ganeshkumar ..... G10L 21/0208
2007/0021958 A1 1/2007 Visser et al.
2015/0221322 A1 8/2015 Iyengar et al.
2015/0332705 A1 * 11/2015 Ioannidis ............ H04R 29/005 381/58
2017/0110142 A1 4/2017 Fan et al.

(Continued)

OTHER PUBLICATIONS

International Search Report and Written Opinion dated May 8, 2023 for Application PCT/US23/13570.

*Primary Examiner* — Vijay B Chawan

(57) ABSTRACT

Methods, systems, and computer-readable media are provided for detecting voice activity. A primary signal is configured to include a speech component representative of a user's speech when the user is speaking in a detection region, or environment. A reference signal is configured to include a reduced speech component relative to the primary signal. One or more conditions of the detection region is/are detected, and a threshold value is selected (or, optionally, calculated) based upon the detected condition(s). The primary signal is compared to the reference signal, with respect to the selected threshold value. An indication of whether the user is speaking is selectively output, based at least in part upon the comparison.

20 Claims, 3 Drawing Sheets

(56) References Cited

U.S. PATENT DOCUMENTS

| | | | | |
|---|---|---|---|---|
| 2017/0345437 | A1* | 11/2017 | Zhang | G10L 21/0224 |
| 2018/0226085 | A1* | 8/2018 | Morton | H04R 3/005 |
| 2018/0277135 | A1 | 9/2018 | Ali et al. | |
| 2019/0104360 | A1 | 4/2019 | Bou Daher et al. | |
| 2019/0122688 | A1* | 4/2019 | Matsuo | H04R 5/04 |
| 2020/0302922 | A1* | 9/2020 | Jazi | G10L 25/84 |

* cited by examiner

VOICE ACTIVITY DETECTION

BACKGROUND

Voice activity detection systems are used to detect when a user of a device is speaking, which may be beneficial in numerous environments and for various purposes. For example, detection of user voice activity may trigger an action, such as initiating a recording, processing a signal to detect a keyword or wake-up word (WuW), activating a virtual personal assistant, and the like. In various systems configured to reduce or cancel echo or noise, for example in a voice signal, an adaptive process (such as an adaptive filter) may exhibit improved performance if adaptation is paused, frozen, halted, etc. during periods of near end (local user) speech activity. Systems to detect near end speech activity may be known in the art as double talk detectors.

In at least one example, an automobile audio system may include a hands-free communication system having one or more microphones to pick up an occupant's voice. The hands-free communication system may employ various echo cancelation and/or suppression subsystems to remove components of the microphone signal that are related to an audio playback produced by the audio system, e.g., to reduce an echo content from the microphone signal. Additionally, the hands-free communications system may employ various noise reduction or suppression subsystems to remove components of the microphone signal that are related to noise in the environment, such as road noise, wind noise, or resonances of the vehicle. Such echo and noise cancelation, reduction, and/or suppression subsystems may exhibit better performance when certain functions, e.g., adaptive functions, are frozen or paused during periods that the occupant is actively speaking. Accordingly, in various applications it may be desirable to accurately detect when a user is actively speaking.

SUMMARY OF THE INVENTION

Aspects and examples are directed to systems and methods that detect voice activity of a user. The systems and methods operate to detect when a user is actively speaking. Detection of voice activity by the user may be beneficially applied to further functions or operational characteristics. For example, detecting voice activity by the user may be used to cue an audio recording, to cue a voice recognition system, activate a virtual personal assistant (VPA), trigger automatic gain control (AGC), adjust acoustic echo or noise processing or cancellation, noise suppression, sidetone gain adjustment, or other voice operated switch (VOX) applications.

According to a first aspect, a method of detecting voice activity is provided that includes receiving a primary signal representative of acoustic energy in a detection region, the primary signal configured to include a speech component representative of a user's speech when the user is speaking, receiving a reference signal representative of acoustic energy in the detection region, the reference signal configured to include a reduced speech component relative to the primary signal, detecting a condition of the detection region, selecting a threshold value based upon the detected condition, comparing the primary signal to the reference signal with respect to the selected threshold value, and selectively indicating that a user is speaking based at least in part upon the comparison.

In some examples, comparing the primary signal to the reference signal comprises comparing whether the primary signal exceeds the reference signal by the selected threshold value.

According to various examples, comparing the primary signal to the reference signal comprises comparing whether a ratio of an energy of the primary signal to an energy of the reference signal exceeds the selected threshold.

In various examples, detecting the condition of the detection region includes detecting at least one of an audio playback, an audio playback level, a noise, and a noise level. Certain examples may include detecting at least one of a rotational rate of a rotating machinery, an open or closed state of an opening to the detection region, and a configuration setting of an audio system.

Some examples may limit a rate of change of at least one of the primary signal and the reference signal by a time constant.

Various examples may provide the primary signal as an arrayed combination of two or more microphone signals.

According to another aspect, a voice activity detector is provided that includes a first sensor in an environment to provide a primary signal, a second sensor in the environment to provide a reference signal, a detector configured to detect a condition of the environment, and a processor configured to: select a threshold value based upon the detected condition, compare the primary signal to the reference signal with respect to the selected threshold value, and selectively indicate that a user is speaking based at least in part upon the comparison.

In some examples, the processor may be configured to indicate the user is speaking when the primary signal exceeds the reference signal by the selected threshold.

In various examples, the processor may be configured to indicate the user is speaking when a ratio of an energy of the primary signal to an energy of the reference signal exceeds the selected threshold.

According to some examples, detecting the condition of the environment may include detecting at least one of an audio playback, an audio playback level, a noise, and a noise level. In certain examples, detecting the condition of the environment may further include detecting at least one of a rotational rate of a rotating machinery, an open or closed state of an opening to the detection region, and a configuration setting of an audio system.

In some examples the processor may be configured to limit a rate of change of at least one of the primary signal and the reference signal by a time constant.

According to various examples, the first sensor may be an arrayed combination of two or more microphones.

According to yet another aspect, a non-transitory computer readable medium is provided having instructions encoded therein that, when processed by a suitable processor, cause the processor to perform a method comprising: receiving a primary signal from a first sensor in an environment, receiving a reference signal from a second sensor in the environment, detecting a condition in the environment, selecting a threshold based at least in part upon the detected condition, comparing the primary signal to the reference signal, and selectively indicating that a user is speaking based at least in part upon the comparison.

In some examples, comparing the primary signal to the reference signal comprises comparing whether the primary signal exceeds the reference signal by the selected threshold value.

In various examples, comparing the primary signal to the reference signal comprises comparing whether a ratio of an energy of the primary signal to an energy of the reference signal exceeds the selected threshold.

According to various examples, detecting the condition of the detection region includes detecting at least one of an audio playback, an audio playback level, a noise, and a noise level. In certain examples, detecting the condition of the detection region further comprises detecting at least one of a rotational rate of a rotating machinery, an open or closed state of an opening to the detection region, and a configuration setting of an audio system.

In some examples, the first sensor comprises two or more microphones and the instructions further cause the processor to provide the primary signal as an arrayed combination of signals from the two or more microphones.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples and are incorporated in and constitute a part of this specification but are not intended as a definition of the limits of the invention(s). In the figures, identical or nearly identical components illustrated in various figures may be represented by a like reference character or numeral. For purposes of clarity, not every component may be labeled in every figure. In the figures.

DETAILED DESCRIPTION

Figure 1:
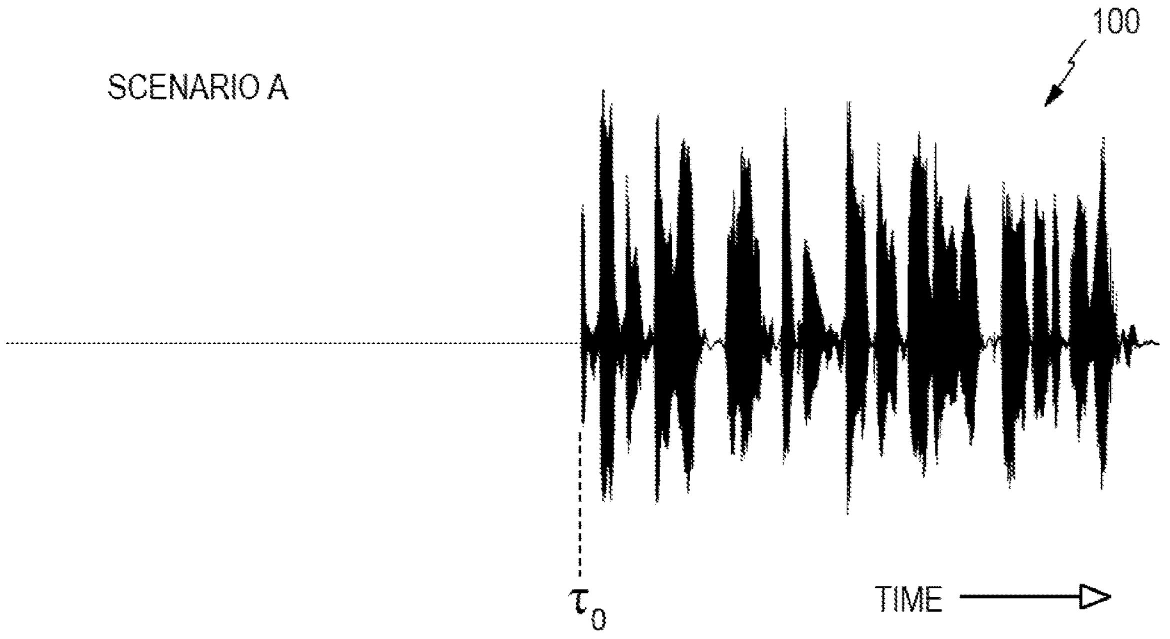
FIG. 1 is a signal diagram of an example audio signal of a user's voice in a first scenario of a quiet environment.

Aspects of the present disclosure are directed to systems and methods that detect voice activity by a person, e.g., a user of the system. Such detection may enhance voice features or functions available as part of an audio or other associated equipment, such as a cellular telephone or audio processing system. Examples disclosed herein may be coupled to, or placed in communication with, other systems, through wired or wireless means, or may be independent of any other systems or equipment.

In accord with aspects and examples disclosed herein, voice activity detection (or detector) (VAD) involves the detection of when a user is speaking. Such may also be referred to herein as a double-talk detector (DTD). In some cases, the output from a voice activity detector or double-talk detector may be a binary flag, such as a one or zero, indicated by a voltage, or a logical true or false, to indicate that a user is speaking.

Additionally in accord with aspects and examples disclosed herein, voice pick-up (VPU) involves capturing an audio signal that includes the user's speech or voice activity. Voice pick-up may include various processing of one or more microphone signals and may be aided by a VAD/DTD. For example, the microphone signals may be processed by variable or adaptive algorithms or filters, such as to reduce echo or noise, which may adapt to conditions while the user is not speaking but may perform best when such adaptation is halted or frozen when the user is speaking. Accordingly, such voice pick-up systems may perform better when they include or are coupled with a quality VAD/DTD functionality.

Conventional double-talk detectors may compute a specific metric based upon available signals, typically microphone signals, and compare the specific metric to a predetermined threshold value. If the computed metric falls on one side of the predetermined threshold, speech activity is assumed present. On the other hand, if the computed metric falls on the other side of the predetermined threshold, speech activity is assumed absent.

For example, a first directional microphone aimed at the user may be expected to pick up acoustic signals that include audio signal components of the user's speech, if the user is talking. Meanwhile a second directional microphone may be aimed away from the user and may be expected to pick up surrounding acoustic signals in the environment and pick up very little user speech. In various examples, a double-talk detector may compare an energy in the signal from the first directional microphone to an energy in the signal from the second directional microphone. For instance, a double-talk detector may take a ratio of signal energies from the two microphones and if the ratio exceeds a threshold such may indicate that the user is talking (e.g., a higher ratio of energy in the signal of the first sensor relative to energy in the second sensor), whereas if the ratio does not exceed the threshold such may indicate that the user is not talking.

In various examples, a directional microphone aimed at the user may be virtually formed by a microphone array of multiple physical microphones, e.g., a beamforming array of multiple microphone signals combined in such a manner as to have increased acoustic response in the direction of the user. Similarly, a directional microphone aimed away from the user may be virtually formed by a microphone array of multiple physical microphones (they could be the same microphones), e.g., a null forming array of the multiple microphones combined in such a manner as to have decreased acoustic response in the direction of the user.

In some examples, a first combination of microphone signals may form an array having an increased acoustic response in the direction of the user (or the expected location of the user's mouth) and the double-talk detector may compare a signal (or a signal energy) of a portion (e.g., frequency limited, time limited, or both) of the first combination to that of a second combination of the microphone signals that form an array having a reduced acoustic response in the direction of the user (or the user's mouth). At least one example of such an array-based double-talk detector is disclosed in U.S. Pat. No. 10,863,269, titled "Spatial double-talk detector" granted on Dec. 8, 2020, and filed on Oct. 2, 2018, the contents of which are incorporated herein in their entirety for all purposes.

Across various examples, any number of types of sensors may be used, such as microphones, accelerometers, vibration detectors, any of which may be directional, arrayed, omnidirectional, etc. Systems and methods in accord with those herein may generate at least one principal or primary signal and at least one reference signal. In some examples the primary signal may be configured to include a component representative of the user's speech and the reference signal may be configured to have a reduced component of the user's speech or be completely free of the user's speech. In various examples, each of the primary signal and the reference signal may have components that represent other sounds in the environment, such as noise, other people talking, audio from an audio playback system, etc. In certain examples, such as in a vehicle environment, each of the primary signal and the reference signal may include components of the user's speech, road noise, wind noise, engine noise, speech from other cabin occupants, output form an audio system, e.g., radio or music, and the like.

According to various examples, the reference signal may be configured to include non-user-speech components that are representative of non-user-speech components of the primary signal. Accordingly, comparisons of the primary signal to the reference signal may indicate whether user speech is present. However, the level and nature of the non-user-speech components may impact how best such a comparison may be made.

The primary signal may include a component representative of the user's speech with signal energy, s1, and the reference signal may include a different (e.g., reduced, cancelled, muffled, etc.) component representative of the user's speech with signal energy, s2. In a quiet environment, there may be no other components in the primary signal and reference signal. In such a case, a ratio of signal energies may be represented as s1/s2 which may be compared to a certain threshold to determine whether the user is speaking. If the environment is not quiet, however, and a non-user-speech signal energy, m, is present in each of the primary signal and the reference signal, then the ratio of signal energies may be represented as (s1+m)/(s2+m), for which a very different threshold may be appropriate. To go further, if the non-user-speech signal energy is doubled, the ratio may be represented as (s1+2m)/(s2+2m), causing yet a different threshold to be appropriate. Accordingly, it may not be possible to select a single threshold that is best for all conditions.

In various examples, the non-user-speech signal energy, m, may be due to any number of things. In the example of a vehicle, occupants may be listening to music via an audio system. Turning up the volume may drastically increase the signal energy, m. The signal energy, m, may also include wind noise or road noise. Accordingly, various systems and methods in accord with those therein may detect various environmental conditions, such as audio playback volume, window position, rotations per minute (RPM) of rotating components (engine, motor, transmission, wheels, etc.), cabin noise level, and the like, upon which to select an appropriate threshold to use for a double-talk detector. In various examples, various threshold values may be stored in a look-up table and retrieved based upon the detected operating or environmental conditions. In some examples, one or more threshold values may be calculated from detected numerical environmental conditions, e.g., quantifiable measurement of noise level, music level, engine noise, RPM, etc.

In at least one example, a double-talk detector may be configured to detect whether an audio system is in an active playback mode or not, and one of two thresholds may be selected based upon whether there is active audio playback. In another example, a double-talk detector may be configured to detect how loudly an audio system is playing (e.g., a user volume setting), and may select (or compute) from a range or scale of threshold values. Similarly, any of multiple threshold values may be selected or computed based upon a detection of surrounding noise levels and/or spectral distribution of noise in the environment. Further, various examples may detect operating conditions (windows, RPM, speed) from which a threshold is selected or computed. In various examples, each of these various thresholds may be combined to provide a single threshold. Alternately, each of these thresholds may be applied to separate double-talk detectors whose outputs may be combined via a combinatorial logic to produce a single binary output representative of whether the user is speaking or not. In some instances, such a combination may include various confidence levels assigned to the various individual double-talk detector outputs.

According to various examples, numerous detected conditions as described above may be combined to select or compute a single threshold to be applied.

In various examples, detected conditions may include type and level of noise(s), such as road surface, wet/dry road, environmental control noise (heating, ventilation, air conditioning [HVAC]), fan noise, HVAC noise in homes or buildings, running water in homes or buildings, etc., and/or interfering audio signals, such as music, radio, navigation, phone/communications, warning signals (collectively: audio playback), etc. Numerous such conditions may impact how well a certain threshold works for a double-talk detector in any number of environments (outside, inside, automobiles or other vehicles, homes, buildings, etc.) and for which it may therefore be desirable to select or compute a threshold value based on the one or more conditions.

Figure 2:
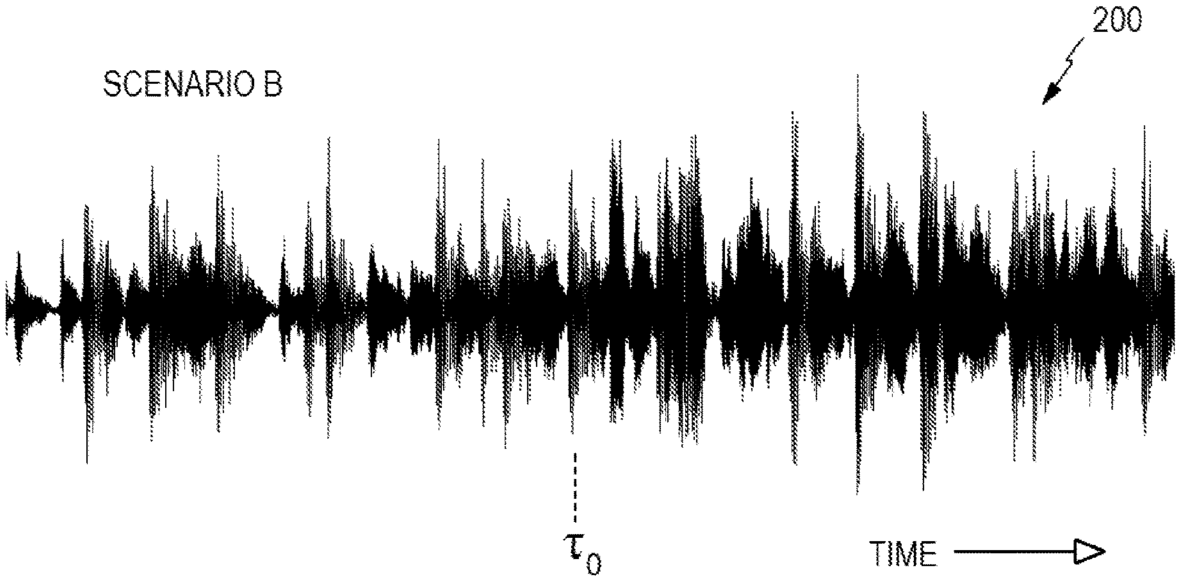
FIG. 2 is a signal diagram of another example audio signal including the user's voice of FIG. 1 in a second scenario of an environment with music.

To illustrate the operation of various double-talk detector systems and methods in accord with those herein, FIGS. 1 and 2 represent audio signals 100, 200, each of which includes identical user speech, in which the user starts to speak at time, To, and in which audio signal 100 is in a quiet environment (scenario A) and audio signal 200 is in the presence of music playing (scenario B).

As explained above, a conventional double-talk detector would compute a specific metric based on the audio signals and compare the metric to a predetermined threshold. If the computed metric is larger (or smaller) than the predetermined threshold, speech activity is assumed present. On the other hand, if the computed metric is smaller (or larger) than the threshold, speech activity is assumed absent.

Figure 3:
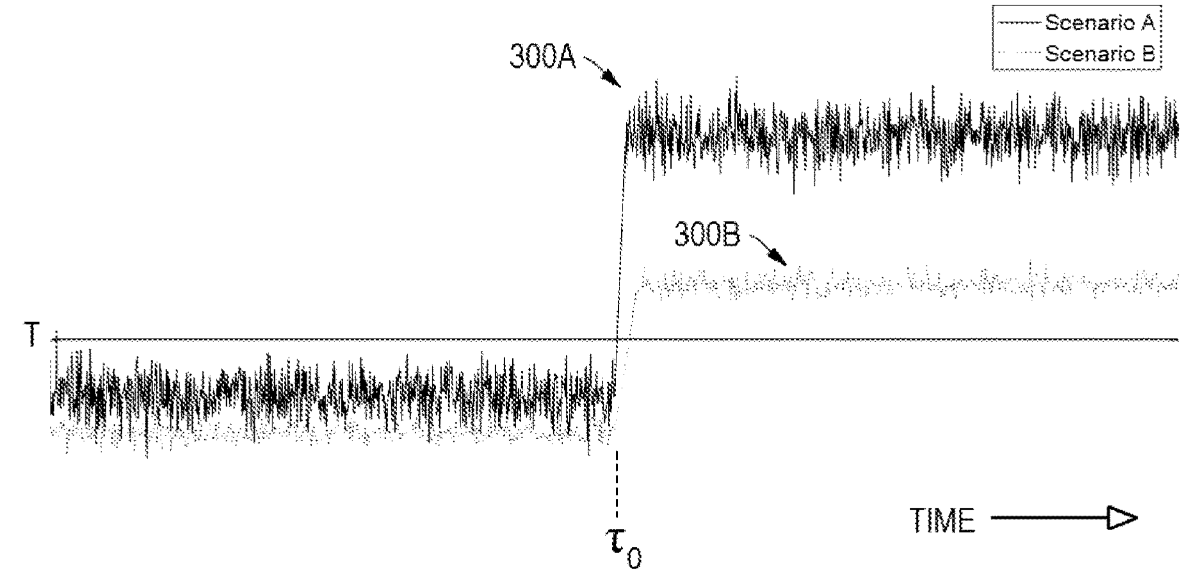
FIG. 3 illustrates a fixed threshold compared to a metric based upon the first and second scenarios of FIG. 1 and FIG. 2.

FIG. 3 illustrates a computed metric 300A, 300B of a conventional double-talk detector as a function of time in scenarios A and B, respectively. A typical value of the predetermined threshold, T, is also shown in FIG. 3. In this example, the value T would have been successful in identifying the speech activity in the two scenarios. It is evident, however, that the threshold T is not ideal for either of the scenarios. Accordingly, this single-threshold double-talk detector is prone to missed detections in scenario B and false alarms in scenario A. Changing the value T to another fixed value might improve the performance in one scenario, but at the expense of a worse performance in the other scenario.

Figure 4:
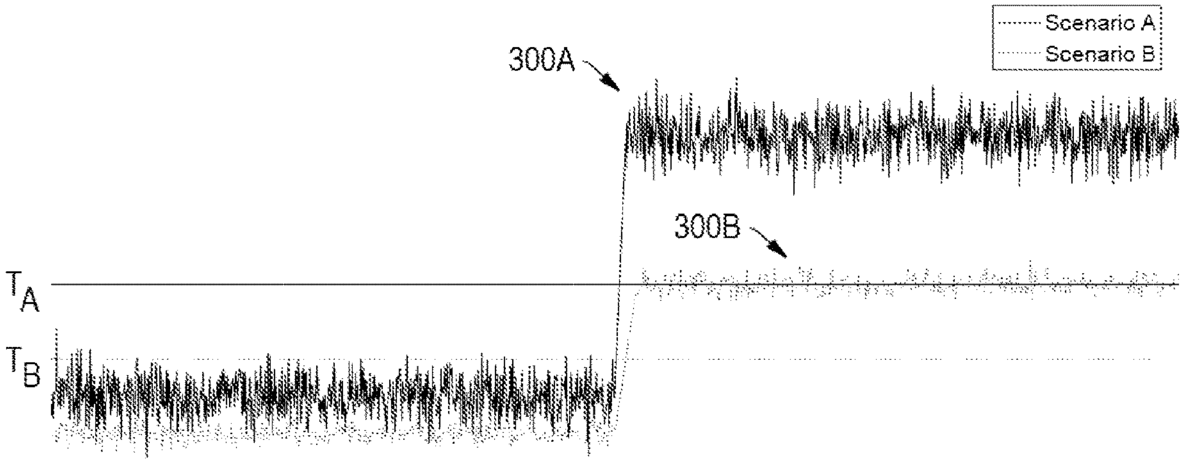
FIG. 4 illustrates multiple example thresholds, each of which applied to one of the first and second scenarios of FIG. 1 and FIG. 2.

Alternately, and in accord with various examples herein, the differing scenarios A and B may be detected through other means and alternate threshold values may be selected, based upon the detected scenario, and applied by the double-talk detector. FIG. 4 illustrates the same computed metric 300A, 300B as FIG. 3, but with differing threshold values based upon the detected scenarios, respectively. A threshold value TA is applied when scenario A is detected, and a threshold value TB is applied when scenario B is detected. More generally, as illustrated, a better optimized threshold value Tx may be selected when a known condition of a scenario X is detected. In this specific example the presence of music may be detected, but in other examples a level of music may also be detected. Similarly, the presence and level of other audio playback, background noise, other talkers, and the like, may be detected and a threshold value may be selected based upon the detected environmental condition(s), in various examples.

The detected environmental condition(s) may be detected by analysis of the signals available, e.g., the presence or absence of music in the signal. However, in many cases the condition does not necessarily need to be detected by other signal analysis, as such conditions could be readily indicated by other systems. For example, in a car audio system, information about the playback settings, including volume control, may be available via various communications interfaces and networks, such as a controller area network (CAN) bus. Such information could include what condition the audio system is in and at what playback level, such as whether it is on a radio station or a cellular voice call, for example, and at what volume. In certain examples, the double-talk detector may be part of or integral to such an audio system and may be configured with various internal communications interfaces, e.g., through registers, memory, etc. such that an appropriate threshold may be selected for the double-talk detector to apply to the metric used.

The example illustrated in FIGS. 1-4 compares the effectiveness of thresholds in two scenarios. If even more than two scenarios were to be considered, it would be extremely difficult to find a single threshold that would work in all scenarios. In this case, a double-talk detector in accord with those herein may include multiple thresholds employed in conjunction with a scenario identifier. Each scenario corresponds to variation(s) in a set of operating and/or environmental conditions.

Figure 5:
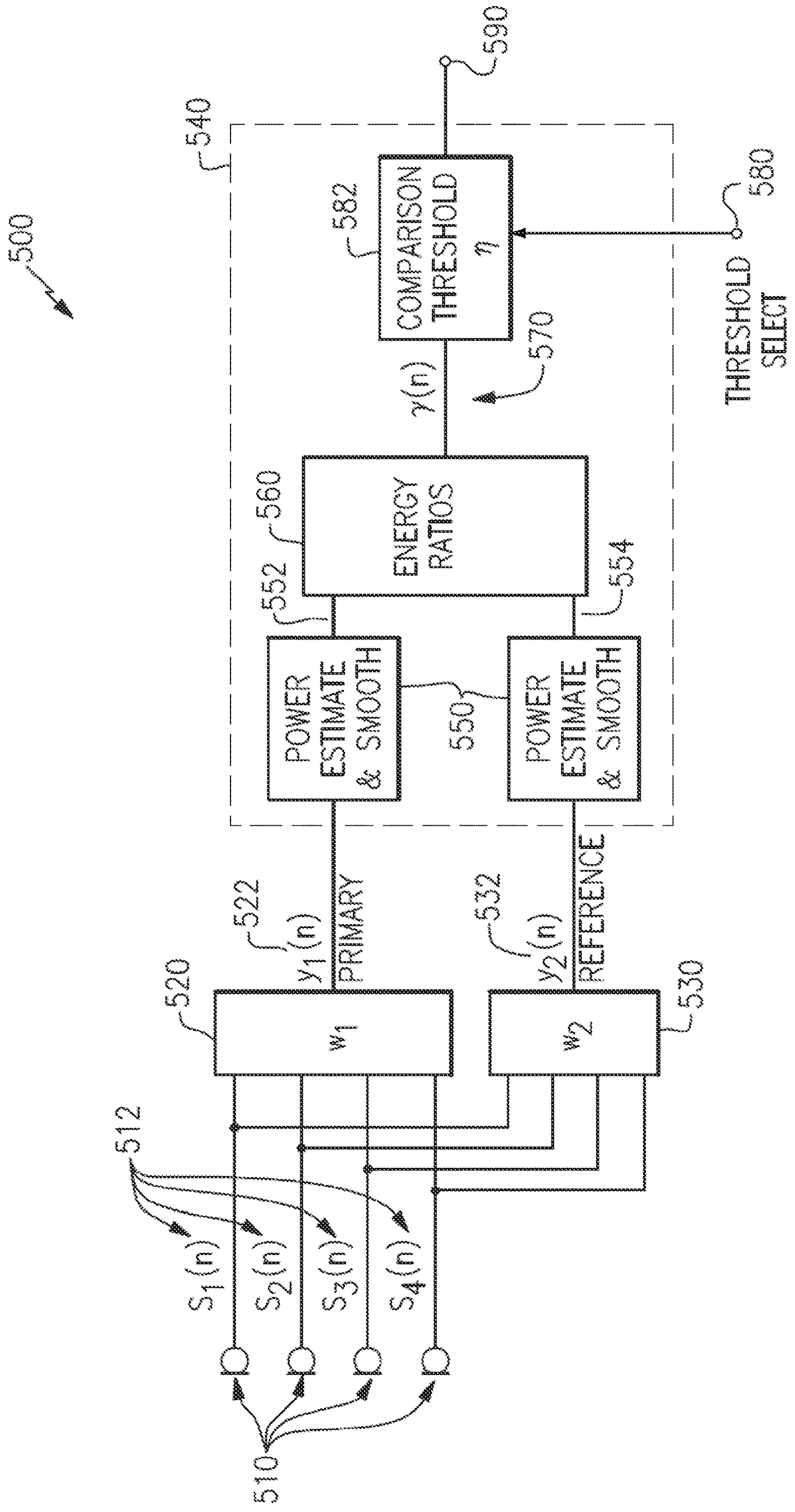
FIG. 5 is a schematic diagram of an example double-talk detector with a variable threshold.

FIG. 5 illustrates a double-talk detector 500 including four microphones 510, each providing a microphone signal 512, $s_i(n)$, to a primary array processor 520 and a reference array processor 530. Each of $s_i(n)$, $(i=1, \ldots, 4)$, represents a time-domain signal at the ith microphone 510. In this example, four microphones are used but more or fewer may be included in other examples. Each of the primary array processor 520 and the reference array processor 530 apply a set of weights, $w_1$ and $w_2$, respectively, for a first and second beamforming configuration. As used herein, beamforming may include a general spatial response, such as a response to a region or "cloud" of potential acoustic source locations, that may be associated with a range of three-dimensional positions from which a user, e.g., a vehicle occupant, may speak. Beamforming can be applied in time-domain or in frequency-domain. $y_1(n)$ represents a time-domain primary signal 522, which is the output of the primary array processor 520, and $y_2(n)$ represents a time-domain reference signal 532, which is the output of the reference array processor 530.

The primary signal 522 and the reference signal 532 are compared by a comparison block 540, which may perform one or more of various processes, such as estimate the energy (or power) in each signal (in total or on a per frequency bin basis), smooth or otherwise time average the signal energies, take ratios of the signal energies, apply various weighting to the signal energies (or ratios in some examples) in particular frequency bins, apply one or more thresholds, or other combinations of more or fewer of these processes, in any suitable order, to determine whether an occupant is speaking at the particular location. An overall result is the comparison block 540 compares the primary signal 522 to the reference signal 532 to determine whether an occupant is speaking, and generally uses a threshold in making such a determination, including comparing signal energies, or calculating a ratio of energies (or amplitudes) of the primary signal 522 to that of the reference signal 532, and comparing the ratio to a threshold.

In various examples, the comparison block 540 may take on many forms, and that illustrated in FIG. 5 is merely one. The comparison block 540 may apply various processing, in certain examples, such as power measurement (e.g., power estimation) (signal energy, or amplitude) and time-averaging, or smoothing, by power estimation blocks 550. In some examples, one or more smoothing parameters may be adjusted to maximize the difference between a smoothed primary power signal 552 and a smoothed reference power signal 554 when the occupant is speaking. In certain examples, the power estimates may be processed on a per frequency bin basis. Accordingly, each of the primary signal 522 and the reference signal 532 may be separated into frequency bins by the power estimation blocks 550, or such separation into frequency bins may occur elsewhere. In some examples, after power estimates are computed, a ratio of the power estimates may be calculated at block 560 to provide an energy ratio 570, y(n).

In various examples, the energy ratio 570 is compared to a selected threshold 580, $\eta$, e.g., by block 582, to detect the presence or absence of speech activity at a point in time. In examples, and as described above, the selected threshold 580, $\eta$, may be retrieved from a look-up table or determined by a computation, either of which is based upon one or more detected conditions, such as environmental noise, audio system playback volume, and others. The selected threshold 580, $\eta$, may be expressed in decibels, in various examples, or in other suitable units. If the selected threshold 580 is met, block 582 provides an indication at an output 590 that occupant speech is detected.

In some examples, the power estimates and ratios (outputs of blocks 550, 560) may be on a per frequency bin basis, and in some examples the energy ratio 572, y(n), may represent a set of multiple ratios (one per frequency bin). In such cases, each frequency bin may have a distinct selected threshold 580 and block 582 may be configured to make multiple comparisons, one for each frequency bin (at each time interval), and combine multiple outputs (from each frequency bin) into a single output 590. In other examples, the set of multiple ratios (one per frequency bin) may be combined into a single ratio (such as by an arithmetic mean, as one example) and block 582 may operate as described above, i.e., to compare the single ratio to a single selected threshold 580.

Any of the above-described methods, examples, and combinations, may be used to detect that a user is actively talking, e.g., to provide voice activity detection/double-talk detection. Any of the methods described may be implemented with varying levels of reliability based on, e.g., microphone quality, microphone placement, acoustic ports, selected threshold values, selection of smoothing time constants, weighting factors, window sizes, etc., as well as other criteria that may accommodate varying applications and operational parameters.

Examples of the methods and apparatuses discussed herein are not limited in application to the details of construction and the arrangement of components set forth in the above descriptions or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity.

Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, first and second, top and bottom, upper and lower, and vertical and horizontal are intended for convenience of description, not to limit the present systems and methods or their components to any one positional or spatial orientation, unless the context reasonably implies otherwise.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of detecting voice activity, the method comprising:

receiving a primary signal representative of acoustic energy in a detection region, the primary signal configured to include a speech component representative of a user's speech when the user is speaking;

receiving a reference signal representative of acoustic energy in the detection region, the reference signal configured to include a reduced speech component relative to the primary signal;

detecting a condition of the detection region, wherein the detected condition is indicative of an acoustic energy level in the detection region;

selecting a threshold value from among two or more values for determining whether the user is speaking, the threshold value selected based upon the detected condition in the region;

comparing the primary signal to the reference signal with respect to the selected threshold value; and providing a binary indication of whether the user is speaking based at least in part upon the comparison.

2. The method of claim 1 wherein comparing the primary signal to the reference signal comprises comparing whether the primary signal exceeds the reference signal by the selected threshold value.

3. The method of claim 1 wherein comparing the primary signal to the reference signal comprises comparing whether a ratio of an energy of the primary signal to an energy of the reference signal exceeds the selected threshold.

4. The method of claim 1 wherein detecting the condition of the detection region includes detecting at least one of an audio playback, an audio playback level, a noise, and a noise level.

5. The method of claim 4 wherein detecting the condition of the detection region further comprises detecting at least one of a rotational rate of a rotating machinery, an open or closed state of an opening to the detection region, and a configuration setting of an audio system.

6. The method of claim 1 further comprising limiting a rate of change of at least one of the primary signal and the reference signal by a time constant.

7. The method of claim 1 further comprising providing the primary signal as an arrayed combination of two or more microphone signals.

8. A voice activity detector for determining whether a user is speaking, comprising:

a first sensor in an environment to provide a primary signal;

a second sensor in the environment to provide a reference signal;

a detector configured to detect a condition of the environment, wherein the condition of the environment is indicative of an acoustic energy level in the environment; and a processor configured to:

select a threshold value for determining whether the user is speaking based upon the detected condition, compare the primary signal to the reference signal with respect to the selected threshold value, and provide a binary indication of whether the user is speaking based at least in part upon the comparison.

9. The voice activity detector of claim 8 wherein the processor is configured to indicate the user is speaking when the primary signal exceeds the reference signal by the selected threshold.

10. The voice activity detector of claim 8 wherein the processor is configured to indicate the user is speaking when a ratio of an energy of the primary signal to an energy of the reference signal exceeds the selected threshold.

11. The voice activity detector of claim 8 wherein detecting the condition of the environment includes detecting at least one of an audio playback, an audio playback level, a noise, and a noise level.

12. The voice activity detector of claim 11 wherein detecting the condition of the environment further comprises detecting at least one of a rotational rate of a rotating machinery, an open or closed state of an opening to the detection region, and a configuration setting of an audio system.

13. The voice activity detector of claim 8 wherein the processor is configured to limit a rate of change of at least one of the primary signal and the reference signal by a time constant.

14. The voice activity detector of claim 8 wherein the first sensor is an arrayed combination of two or more microphones.

15. A non-transitory computer readable medium having instructions encoded therein that, when processed by a suitable processor, cause the processor to perform a method comprising:

receiving a primary signal from a first sensor in an environment;

receiving a reference signal from a second sensor in the environment;

detecting a condition in the environment, wherein the condition in the environment is indicative of an acoustic energy level in the environment;

selecting a threshold for determining whether a user is speaking based at least in part upon the detected condition;

comparing the primary signal to the reference signal; and providing a binary indication of whether the user is speaking based at least in part upon the comparison.

16. The non-transitory computer readable medium of claim 15 wherein comparing the primary signal to the reference signal comprises comparing whether the primary signal exceeds the reference signal by the selected threshold value.

17. The non-transitory computer readable medium of claim 15 wherein comparing the primary signal to the reference signal comprises comparing whether a ratio of an energy of the primary signal to an energy of the reference signal exceeds the selected threshold.

18. The non-transitory computer readable medium of claim 15 wherein detecting the condition of the detection region includes detecting at least one of an audio playback, an audio playback level, a noise, and a noise level.

19. The non-transitory computer readable medium of claim 18 wherein detecting the condition of the detection region further comprises detecting at least one of a rotational rate of a rotating machinery, an open or closed state of an opening to the detection region, and a configuration setting of an audio system.

20. The non-transitory computer readable medium of claim 15 wherein the first sensor comprises two or more microphones and the instructions further cause the processor to provide the primary signal as an arrayed combination of signals from the two or more microphones.

* * * * *